A. W. H. LENDERS.
APPARATUS FOR FREEING LUMP STARCH FROM ADHERING DUST OR POWDER.
APPLICATION FILED MAR. 30, 1914.

1,193,274.

Patented Aug. 1, 1916.
3 SHEETS—SHEET 1.

A. W. H. LENDERS.
APPARATUS FOR FREEING LUMP STARCH FROM ADHERING DUST OR POWDER.
APPLICATION FILED MAR. 30, 1914.
1,193,274.
Patented Aug. 1, 1916.
3 SHEETS—SHEET 2.
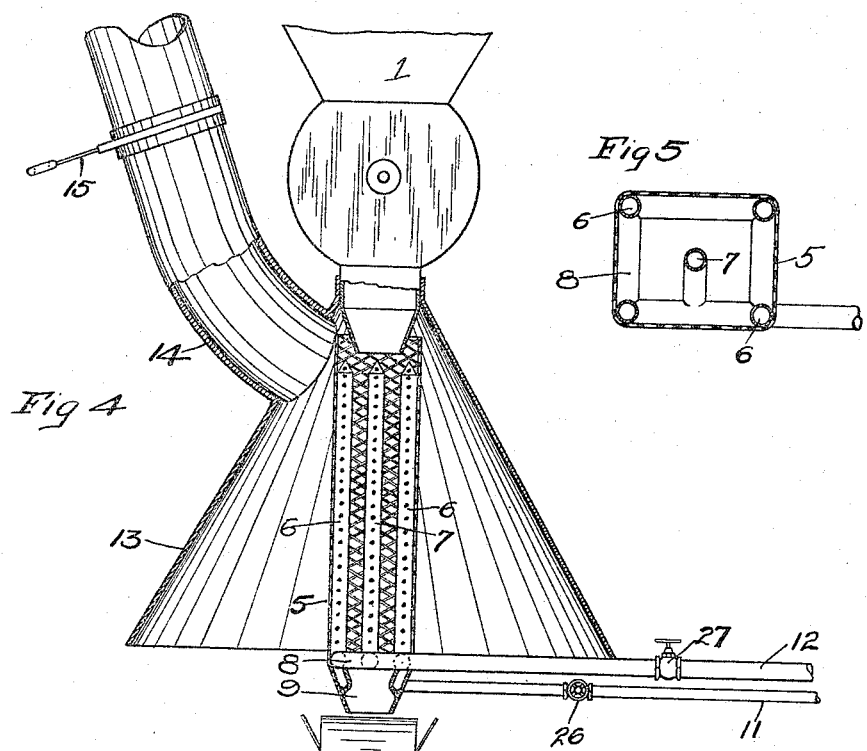
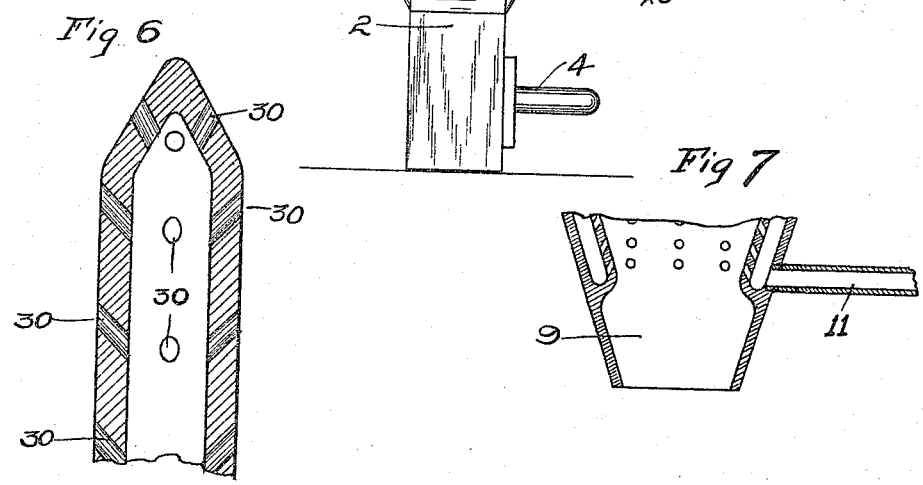

A. W. H. LENDERS.
APPARATUS FOR FREEING LUMP STARCH FROM ADHERING DUST OR POWDER.
APPLICATION FILED MAR. 30, 1914.
1,193,274.
Patented Aug. 1, 1916.
3 SHEETS—SHEET 3.
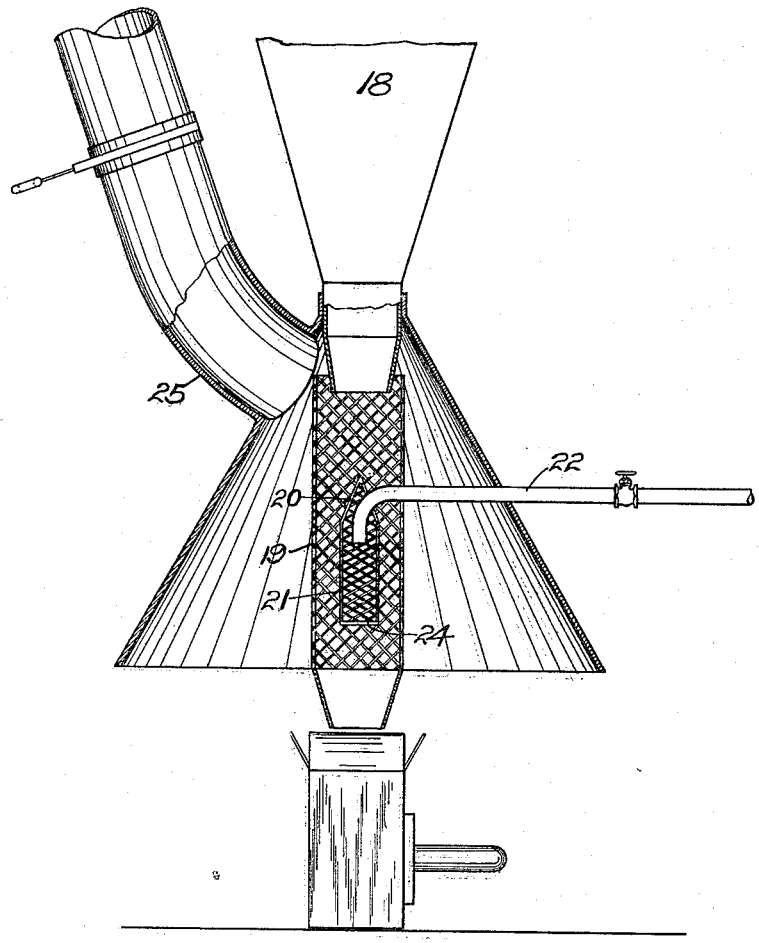

UNITED STATES PATENT OFFICE.

ADOLPH W. H. LENDERS, OF CEDAR RAPIDS, IOWA.

APPARATUS FOR FREEING LUMP-STARCH FROM ADHERING DUST OR POWDER.

1,193,274. Specification of Letters Patent. Patented Aug. 1, 1916.

Application filed March 30, 1914. Serial No. 828,415.

*To all whom it may concern:*

Be it known that I, ADOLPH W. H. LENDERS, a citizen of the United States, residing at Cedar Rapids, in the county of Linn and State of Iowa, have invented a certain new and useful Apparatus for Freeing Lump-Starch from Adhering Dust or Powder, of which the following is a specification.

An examination of the carton containing the lump starch, such as is now on the market, discloses the fact that the carton contains a certain percentage of dust and that the surfaces are coated with an adhering starch powder.

My invention has for its object to provide apparatus which when used in connection with the packing of the lump starch will produce an absolutely new product, that is, dustless lump starch.

Figure 1:
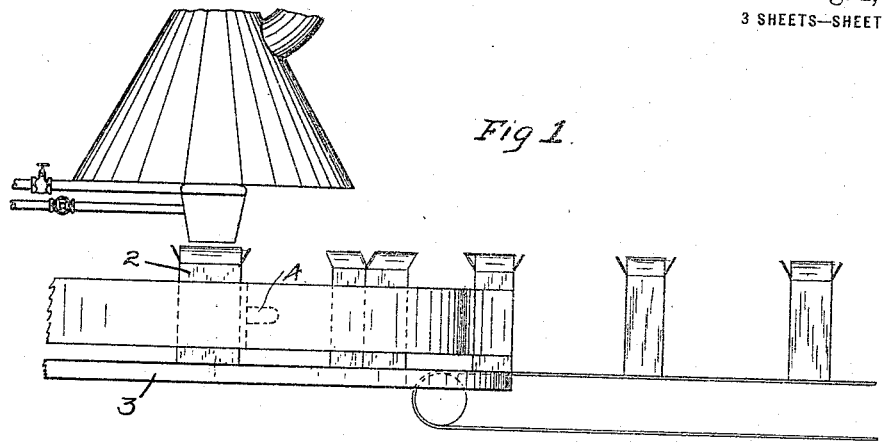
Figure 2:
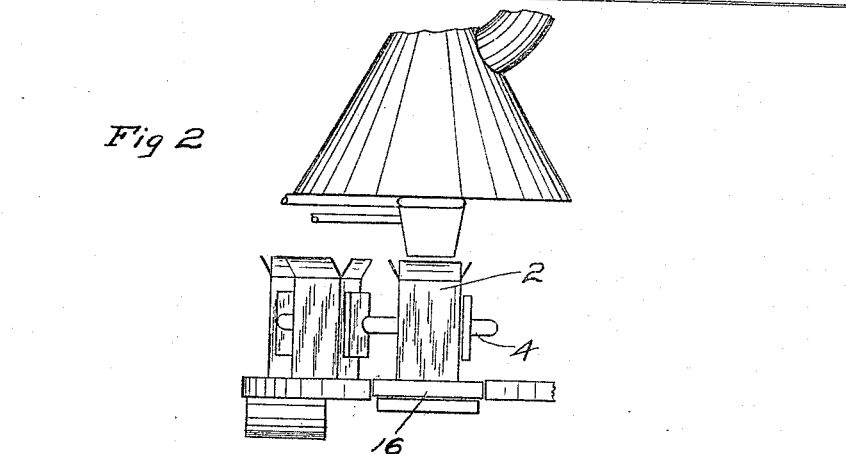
Figure 3:
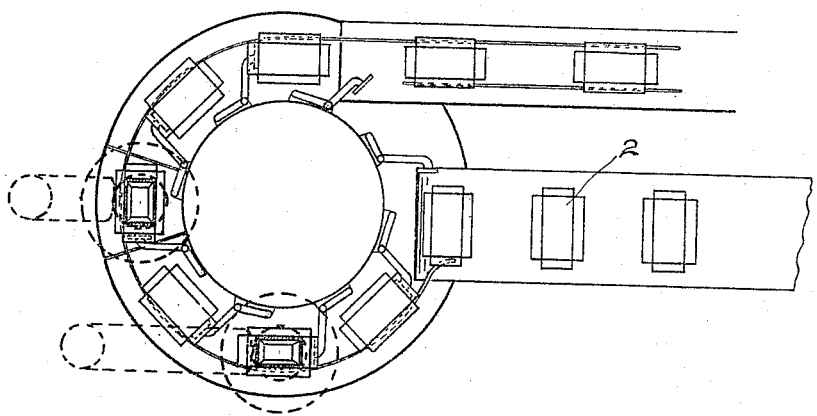

My means of accomplishing the foregoing object may be more readily understood by having reference to the accompanying drawings, which are hereunto annexed and are a part of this specification, in which:

Figure 1, is a view of my improved apparatus applied to a starch filling and weighing machine. Fig. 2, shows the form of apparatus used in connection with the same machine for the smaller lumps. Fig 3, is a top or plan view, the hoods being shown in dotted lines for the sake of clearness. Fig. 4, is an enlarged detail view, partly in section, showing the interior construction of the device for handling the larger lumps. Fig. 5, is an enlarged cross-sectional view of the apparatus. Fig 6, is an enlarged fragmentary vertical sectional view of one of the compressed air pipes. Fig. 7, is a fragmentary detail view in vertical section of the delivery spout. Fig. 8, is an enlarged detail view of the apparatus partly in section for handling the fine lumps.

Similar reference numerals refer to similar parts throughout the entire description.

As shown in the drawings, 1, indicates a portion of the filling hopper of the filling and weighing machine, which is designed to fill the carton with the larger lumps. The carton is indicated by the reference numeral 2. As is usual in these machines, it is pushed along a plane 3, by means of arms 4, which are secured to a traveling member. Just above the discharge orifice of the hopper 1, is located a cylinder in which are a plurality of blades or knives which are rotatably mounted therein and which serve to expel the lump starch from the orifice and also to break up the larger lumps into sizes suitable for the carton which is being packed and filled.

As shown, my improved invention is mounted intermediate the discharge orifice of the hopper 1, and the carton 2. The apparatus for this size of lump comprises a four-sided structure, the walls 5 of which are formed of screen or foraminated metal; within this screen, preferably located as indicated in the corners formed by the walls, are mounted a plurality of upwardly extending pipes, 6, and in some instances it may be found desirable to provide an additional pipe 7, placed in the center of the inclosure. These pipes, as shown in the drawings, extend to a point adjacent the top of a screen, and at the bottom are suitably connected to a pipe 8, which encircles the bottom of the screen wall 5, although if desired, it may be formed by a part of the wall itself which reaches from this point down to the delivery spout 9, which as shown is a double wall jacket, the inner inclined walls of which are provided with a plurality of perforations which direct the jets of air upwardly so as to insure the complete action of freeing the lumps from the starch dust. These walls taper inwardly to the delivery spout 9, which is designed of a size and shape suitable for the carton which is being filled.

Suitable pipe connections 11 and 12, leading from a source of compressed air supply (not shown) are connected to the jacket 9, and to the encircling pipe 8. The pipes 6 and 7, are provided with a plurality of minute perforations extending at various angles to their axis. It may be found desirable in some instances, to construct these perforations with an upward inclination as shown in Fig. 6. About the rectangular structure and extending to a point adjacent the encircling pipe 8, is placed an inverted cone 13, which is provided with a pipe 14 at one side adjacent to its upper end. This pipe is connected to an exhaust fan (not shown) which produces a suction. The pipe 14, is provided with a flat damper 15, of the usual construction in order to vary the suction, or for shutting off the suction, if desired.

After receiving a predetermined quantity of lumps from the hopper 1, the carton 2, is moved onwardly, through the mediums of the arms 4. on to the weighing apparatus 16, in which position it will be in register with the discharge orifice of the hopper 18, the starch discharged through this hopper being automatically controlled by the operation of the weighing mechanism, it being designed to fill the carton until it is brought up to the desired weight. For this purpose it is customary to employ the finer lumps of starch sometimes called granular, pearl, or fine lump in the trade. In connection with starch of this character, I employ a different form of apparatus than that used in connection with the larger lumps. As shown, this consists of a cylinder 19, the wall of which is formed of screen or other suitable foraminated sheet of metal which has mounted in its center an inverted conoidal shaped structure 20, having vertical cylindrical walls 21, depending downwardly from the lower edge of the cone.

A pipe 22, which is connected to a suitable source of compressed air supply enters the conoidal structure 20, at the top, and is adapted to discharge the air in the interior of the said structure. The air issuing from the pipe, strikes the bottom 24 of the cylindrical wall 21. This bottom is made solid and diverts the direction of the air current so that it passes out radially through the foraminations in the walls 20. The downwardly moving starch passes through the annular space surrounding the conoidal structure 19, its course of travel being directed by means of the shape of the said structure and it necessarily passes through the current of air which is passing radially from the cylindrical walls 21. The foraminations in the walls of the outer cylinder are of such size as to permit the escape of the dust, but are small enough to prevent the discharge of the fine lump or pearl. An inverted structure similar to the cone used in the first filling hopper is placed about the outer cylindrical walls and is provided with a pipe 25, which is connected by a pipe to the pipe 14, leading to the exhaust fan.

The operation of the device is as follows: The weighing machine apparatus is put into motion and the large lumps pass generally through the hopper 1, and through the blades or knives in the cylinder, whence it enters the four-sided structure. The valves 26, and 27, placed in the compressed air pipes, having been previously opened, the damper 15, is then opened in the suction pipe 14.

It will be obvious that the lumps will be subjected to a blast of compressed air traveling in various directions due to the large number of perforations in the pipes. This has the effect of driving the dust through the walls of the structure and the dust laden air is immediately drawn by suction up into the pipe 14, through which it can be conducted to a separating chamber (not shown) of the usual form of construction. This results in instantly freeing the surfaces of the lumps of starch from every particle of adhering starch dust, and it is delivered to the carton perfectly clean and free from dust. When a predetermined quantity of starch has been delivered to the carton, it is then automatically carried forward on the plane 3, to the weighing apparatus, and the pearl or fine lump is delivered into the package containing the required weight. The fine lump is delivered from the hopper 16, downwardly, where it strikes upon the conoidal structure, 19, which deflects it into the annular space surrounding the cylindrical walls 21, where it comes in contact with the air from the pipe 22. This drives the dust out of the starch through the walls of the outer cylinder, 19, and the suction draws this dust laden air into the pipe 25, and through it into the pipe 14, whence it passes into the herein-before mentioned separating chamber (not shown).

Although I have shown and described a specific form of apparatus for obtaining this result, it will be apparent to persons skilled in the art, that the invention is not restricted to the concrete embodiment shown, but shall only be limited by limitations imposed by the hereinafter contained claims.

Having described my invention what I regard as new, and desire to obtain by Letters Patent, is:

1. The combination with a hopper of a polygonal structure which receives the contents of said hopper, there being an unobstructed passage through said structure the side walls of said structure being formed of screen, means to direct a plurality of jets of compressed air across the path of travel of the material discharged by the hopper, whereby all the surface adhering dust or starch-flour is taken up by the air and driven through the screen, and means to draw off said dust-laden air, said means extending to the lower plane of the walls of said chamber, and being open to the atmosphere.

2. A device of the character described comprising the combination with a hopper of a many-sided structure the walls of which are formed of foraminated material said structure being adapted to receive the contents of the hopper, a delivery spout at the bottom of said many-sided structure said delivery spout being formed of a double walled jacket, there being a plurality of perforations adapted to direct jets of air upwardly formed in the inner walls of the jacket, means to lead a supply of compressed air to said jacket, a plurality of upwardly extending pipes in said structure, there being a plurality of perforations in said pipes, means to lead a supply of compressed air to said pipes, means surrounding said structure to draw off the dust laden air.

3. A device of the character described comprising the combination with a hopper, of a many-sided structure, the walls of which are formed of screen, said structure being adapted to receive the contents of the hopper, a delivery spout at the bottom of said structure formed of a double-walled jacket the walls of which taper inwardly, there being a plurality of vertical perforations in the inner wall, means to lead a supply of compressed air to the interior of said jacket, a plurality of upwardly extending pipes in said structure, means to lead a supply of compressed air to the said pipes, there being a plurality of perforations in said pipes, a cone surrounding said structure, a pipe leading from the interior of said cone, said pipe being connected to means for producing a suction.

4. A device of the character described comprising the combination with a hopper, of a many-sided structure, the walls of which are formed of screen, said structure being adapted to receive the contents of the hopper, a plurality of upwardly extending pipes in said structure, means to lead a supply of compressed air to the said pipes, there being a plurality of perforations in said pipes, said perforations being angularly inclined, a cone surrounding said structure, a pipe leading from the interior of said cone, said pipe being connected to means for producing a suction.

5. A device of the character described, comprising the combination of a hopper, of a polygonal structure, the walls of which are formed of foraminated material, there being an unobstructed passage through said structure, said structure being adapted to receive the contents of the hopper, a supply of compressed air, means to direct said compressed air in jets from various directions, a cone surrounding said structure, whose sides flare downwardly and outwardly, said means extending to the lower plane of the walls of said chamber and being open to the atmosphere, a pipe leading from the interior of said cone adjacent its upper part, said pipe being connected to means for producing a suction whereby a zone of clean air is maintained adjacent the bottom of the polygonal structure.

6. The combination with a hopper which discharges a lump product, of a chamber intermediate the orifice of said hopper and a receptacle, means to drive any adhering dust from said lumps through the walls of the chamber and means to draw off the dust laden air in an opposite direction to the travel of the lumps, said means extending to the lower plane of the walls of said chamber and being open to the atmosphere.

7. A device of the character described comprising the combination with a hopper of a many-sided structure the walls of which are formed of screen, said structure being adapted to receive the contents of the hopper, a delivery spout at the bottom of said structure the walls of which are tapered inwardly, a plurality of upwardly extending pipes in said structure, means to lead a supply of compressed air to the said pipes, there being a plurality of perforations in said pipes, means surrounding said structure to draw off the dust-laden air in an opposite direction from the travel of the material, and means to direct the compressed air current upwardly within said many sided structure.

8. The combination with a hopper which discharges a lump product, of a chamber intermediate the orifice of said hopper and a receptacle, a discharge hopper at the bottom of said chamber, means passing through said discharge hopper to drive any adhering dust from the lumps upwardly and through the walls of the chamber, and means to draw off the dust-laden air in an opposite direction to the travel of the lumps, whereby a zone of air which is free from starch dust or powder is maintained adjacent the point of delivery of said lumps.

In testimony whereof, I have signed the foregoing specification.

ADOLPH W. H. LENDERS.

Witnesses:
A. M. DOUGLAS,
R. W. BLACK.